United States Patent
Doi et al.

[11] Patent Number: 6,111,018
[45] Date of Patent: Aug. 29, 2000

[54] RESIN COMPOSITION

[75] Inventors: Toru Doi; Hiroshi Inoue, both of Mie-ken, Japan

[73] Assignee: Tosoh Corporation, Yamaguchi-ken, Japan

[21] Appl. No.: 09/167,542

[22] Filed: Oct. 7, 1998

[30] Foreign Application Priority Data

Nov. 10, 1997 [JP] Japan ................................. 9-306997

[51] Int. Cl.⁷ .................................................. C08L 39/04
[52] U.S. Cl. ........................... 525/203; 525/205; 525/213; 525/214; 525/215
[58] Field of Search .................................. 525/203, 205, 525/213, 214, 215

[56] References Cited

U.S. PATENT DOCUMENTS 4,458,046  7/1984  Hornbaker et al. ..................... 524/399
5,580,928  12/1996  Doi et al. ................................ 525/205

FOREIGN PATENT DOCUMENTS 1062872  5/1964  United Kingdom .

*Primary Examiner*—Nathan M. Nutter
*Attorney, Agent, or Firm*—Nixon & Vanderhye

[57] ABSTRACT

There is disclosed a resin composition comprising about 99–1% by weight of a vinyl chloride resin and about 1–99% by weight of a copolymer of about 30–70 mol % N-substituted maleimide structural unit and about 70–30 mol % olefinic structural unit. The composition has excellent forming and molding properties and provides formed or molded products of improved heat resistance and mechanical properties.

10 Claims, No Drawings

RESIN COMPOSITION

BACKGROUND OF THE INVENTION

This invention relates to a resin composition, in particular, a resin composition having excellent heat resistance and mechanical properties and which comprises a maleimide-olefin copolymer in combination with a vinyl chloride resin.

Vinyl chloride resins have excellent chemical resistance and weather resistance properties and are relatively inexpensive. Therefore, they are widely used as general-purpose resin, for example in the production of building materials, such as rainwater gutters, pipes, tubes, corrugated sheets etc., for food-packaging purpose, in the production of parts of medical appliances, sundries and the like. However, in general, since vinyl chloride resins including vinyl chloride homopolymer and copolymers exhibit low heat resistance, their uses or applications are greatly restricted.

Thus, several ways of improving the heat resistance properties of vinyl chloride resins have been proposed, for example, blending a vinyl chloride resin with a chlorinated polyvinyl chloride resin, copolymerizing vinyl chloride monomer with another vinyl monomer, such as an N-substituted maleimide, blending a vinyl chloride resin with a copolymer of a styrene and/or methacrylate ester monomer with an N-substituted maleimide, and the like.

However, blending of a vinyl chloride resin with a chlorinated polyvinyl chloride resin will present a problem that the resulting resin composition is not satisfactorily improved in terms of heat resistance properties and is poor in processability and transparency properties. Further, in the case of copolymerizing vinyl chloride monomer with other vinyl monomer such as an N-substituted maleimide, there is a substantial difference in the copolymerization reactivity between vinyl chloride monomer and N-substituted maleimide monomer, that is the copolymerization reactivity of N-substituted maleimide is much higher than that of vinyl chloride monomer. Therefore, during copolymerization, there are produced N-substituted maleimide homopolymer and vinyl chloride homopolymer in addition to the desired vinyl chloride-N-substituted maleimide copolymer. Such a contaminated copolymer product tends to give moldings and formings of poor surface texture due to the difference in the melt-flow behavior between the polymeric components. Such poor surface texture leads to a problem of low mechanical properties of the moldings and formings. Further, blending a vinyl chloride resin with a copolymer of styrene and/or a methacrylate ester with an N-substituted maleimide gives rise to a problem that the resulting blend composition will exhibit low transparency and poor mechanical properties due to low compatibility between the vinyl chloride resin and said N-substituted maleimide copolymer and also a large difference in the processing temperature between the vinyl chloride resin and the N-substituted maleimide copolymer.

SUMMARY OF THE INVENTION

Accordingly, a primary object of the present invention is to provide a resin composition which exhibits excellent heat resistance and mechanical properties.

As a result of intensive studies conducted in order to solve the aforementioned problems of the prior art, the present inventors have found that a resin composition comprising a maleimide-olefin copolymer and a vinyl chloride resin can solve the prior art problems. This finding has led to the accomplishment of the present invention.

Thus, the invention relates to a resin composition which comprises about 1–99% by weight of a maleimide-olefin copolymer and about 99–1% by weight of a vinyl chloride resin, said maleimide-olefin copolymer comprising about 30–70 mol % of at least one kind of structural unit (1) and about 70–30 mol % of at least one kind of structural unit (2):

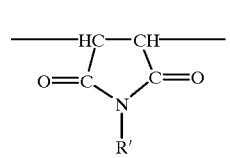

(1)

wherein $R^1$ represents an alkyl group having 1–4 carbon atoms or a cycloalkyl group having 3–10 carbon atoms;

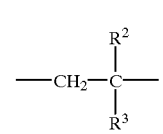

(2)

wherein $R^2$ and $R^3$ represent each and independently a hydrogen atom or an alkyl group having 1–8 carbon atoms.

PREFERRED EMBODIMENTS OF THE INVENTION

The invention will be described in more detail with reference to the preferred embodiments.

The present resin composition comprises about 99–1% by weight of a vinyl chloride resin and about 1–99% by weight of a maleimide-olefin copolymer comprising about 30–70 mol % of at least one kind of the above-defined structural unit (1) and about 70–30 mol % of at least one kind of the above-defined structural unit (2). If the maleimide-olefin copolymer is present in a proportion of less than about 1% by weight, the resin composition exhibits poor heat resistance. On the other hand, where said copolymer is present in a proportion in excess of about 99% by weight, the resin composition becomes brittle and exhibits poor mechanical properties.

The maleimide-olefin copolymer used in the invention comprises about 30–70 mol %, preferably 45–55 mol % of structural unit (1); and about 70–30 mol %, preferably 55–45 mol % of structural unit (2), wherein $R^1$ is an alkyl group having 1–4 carbon atoms or a cycloalkyl group having 3–10 carbon atoms, and $R^2$ and $R^3$ are each and independently a hydrogen atom or an alkyl group having 1–8 carbon atoms. If the proportion of structural unit (1) is in excess of about 70 mol %, the resulting resin composition of the invention becomes brittle. On the other hand, if the proportion of structural unit (1) is less than about 30 mol %, then the resulting resin composition does not show improved heat resistance and mechanical properties.

In order to prepare the maleimide-olefin copolymers which may be used in the invention, it is possible to employ any processes by which the copolymers are obtained; for example a radical copolymerization reaction between an N-substituted maleimide and an olefin may produce a desired copolymer.

Examples of the N-substituted maleimide monomers from which structural unit (1) may be derived include N-methyl maleimide, N-ethyl maleimide, N-propyl maleimide, N-isopropyl maleimide, N-butyl maleimide, N-isobutyl maleimide, N-t-butyl maleimide, N-cyclopropyl maleimide, N-cyclohexyl maleimide and the like. These N-substituted maleimides may be used either alone or in combination of two or more thereof.

Examples of the olefins from which structural unit (2) may be derived include ethylene, propylene, isobutene and the like. The olefins may be used either alone or in combination of two or more thereof.

Thus, in the present invention, may be used a maleimide-olefin copolymer which comprises one or more kinds of structural units derived from the N-substituted maleimide monomer or monomers in conjunction with one or more kinds of structural units derived from the olefin or olefins. Preferably, the maleimide-olefin copolymer is N-methylmaleimide-isobutene copolymer, N-ethylmaleimide-isobutene copolymer or N-cyclohexyl maleimide-isobutene copolymer, because these copolymers are outstandingly well compatible with vinyl chloride resins as well as they, when blended with vinyl chloride resins, provide resin compositions exhibiting excellent heat resistance and mechanical properties.

The maleimide-olefin copolymer used in the invention may be prepared by any suitable known polymerization technique, for example, bulk polymerization, solution polymerization, suspension polymerization or emulsion polymerization.

In the polymerization process, a polymerization initiatior may be used. Examples of the initiators which may be used include organic peroxides, such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate and the like; and azo initiators, such as 2,2'-azobis (2,4-dimethyl valeronitrile), 2,2'-azobis (2-butyronitrile), 2,2'-azobis-isobutyronitrile, dimethyl-2,2'-azobis-isobutyrate, 1,1'-azobis (cyclohexane-1-carbonitrile) and the like.

Where the copolymerization is effected by solution polymerization technique, examples of the solvents which may be used therefor include benzene, cyclohexane, dioxane, tetrahydrofuran, acetone, methyl ethyl ketone, dimethyl formamide isopropyl alcohol and the like. If the copolymerization is effected by precipitation polymerization technique, a mixed solvent containing an aromatic solvent and an alcohol is preferably employed.

The polymerization temperature used in the process for preparing the maleimide-olefin copolymer may be selected depending upon the decomposition temperature of the particular polymerization initiator to be used in the process. In general, the process is conveniently effected in the range of about 40–150° C.

Alternatively, the maleimide-olefin copolymer used in the invention may be prepared through a route comprising the steps of copolymerizing maleic anhydride with an olefin to give a maleic anhydride-olefin copolymer and, then, post-imidizing the copolymer by an appropriate alkyl amine, such as methyl amine, ethyl amine or the like. Such a post-imidizing reaction may be effected, for example, by melting the maleic anhydride-olefin copolymer or dissolving or suspending said copolymer in a solvent (e.g. an alcohol such as methanol, ethanol or propanol, or an aromatic solvent such as benzene or tolnene) and subjecting the molten, or dissolved or suspended copolymer to dehydration-cyclization with the alkyl amine at a temperature of about 100–350° C.

The maleimide-olefin copolymer used according to the invention shows excellent compatibility with vinyl chloride polymers. In order to ensure that resin composition is excellent especially in molding and forming properties and mechanical properties, preferably the copolymer should have a weight average molecular weight (hereinafter, will be referred to as Mw) of about $1 \times 10^3$—about $5 \times 10^6$ that is calculated in terms of polystyrene as determined by gel permeation chlomatography (hereinafter, will be referred to as GPC).

The maleimide-olefin copolymer used in the invention may have a further comonomeric component or components (such as maleic anhydride) copolymerized in addition to the maleimide and olefin components, to the extent that the presence of the additionally copolymerized component or components does not give rise to problems contorary to the purpose of the invention. It is also possible to blend the maleimide-olefin copolymer with such a resin as acrylonitrile-styrene copolymer compatible with the former, prior to blending the former with the vinyl chloride resin to give the resin composition of the invention.

The vinyl chloride resin used in the invention may be any one falling in the category of "vinyl chloride resins" known in the art, which contain a major proportion of vinyl chloride unit. Examples which may be mentioned include polyvinyl chloride, vinyl chloride-ethylene copolymer, vinyl chloride-vinyl acetate copolymer, and vinyl chloride-vinyl propionate copolymer, which are commercially available.

In order to provide the present resin composition with excellent processing and working properties and satisfactory mechanical properties, it is preferred that the vinyl chloride resin to be used for preparing the resin composition should be of a polymerization degree ranging from about 100 to about 5000.

The method for preparing the resin composition of the invention may be any one by which the composition can be appropriately prepared. For example, the maleimide-olefin copolymer and the vinyl chloride resin may be heated, molten, and mixed together to give a desired composition.

For this purpose, for example, Banbury mixer (manufactured by Farrel), internal mixer (manufactured by Kurimoto Iron Works, Ltd.), mechanical press kneaders such as press kneader (manufactured by Moriyama Seisakusho Ltd.) and intensive mixer (manufactured by Nippon Roll Mfg. Co., Ltd.), roll kneader, single-screw extruder, double-screw extruder and the like may be employed.

Where the resin composition of the invention is prepared by the aforementioned heating-melting-mixing procedure, the operation temperature ranges preferably from about 100° C. to about 300° C.

The resin composition of the invention may contain other polymers, filler, dye, pigment, stabilizer, UV absorber, processing aid, flame retardant, antistatic agent and other additives, provided that they do not have an adverse effect on the invention.

The resin composition of the invention may be shaped or molded into various formings and moldings by any suitable known techniques such as injection molding, extrusion molding, calendering, etc. The moldings and formings may be printed or decorated by printing, or further fabricated, for example, by machining, adhesive bonding or other known techniques.

EXAMPLE

The invention will now be illustrated in detail with reference to the following non-limiting examples.

Maleimide-olefin copolymers which were produced in the following Preparations 1 and 2 and resin compositions of the examples were tested or assessed by the below methods.

Weight-average molecular weight (Mw) of maleimide-olefin copolymer

The weight-average molecular weight (Mw) of the maleimide-olefin copolymers was determined as a weight-average molecular weight in terms of polystyrene using a gel permeation chromatograph apparatus (HLC-8120 manufactured by Tosoh Corporation) with a chloroform solvent at an operation temperature of 40° C.

Glass transition temperature (Tg)

The glass transition temperature was determined using a differential scanning calorimeter (DSC 200 manufactured by Seiko Instruments Industry Co., Ltd.) at a heating rate of 10° C./minute.

Flexural strength and flexural modulus

The flexural strength and flexural modulus were determined in accordance with the procedure of ASTM D790.

Preparation 1: Synthesis of N-methylmaleimide-isobutene copolymer

A 30-liter autoclave provided with a stirrer, a nitrogen gas inlet, a thermometer and a degassing outlet was charged with 1.2 kgs. of N-methylmaleimide, 8 grams of t-butylperoxyneodecanoate and 15 liters of a mixed solvent of toluene and methanol (1:1 by weight). The interior of the autoclave was purged with nitrogen gas several times. Thereafter, 8.5 liters of isobutene was introduced. The system was warmed to 60° C., and the polymerization was allowed to proceed at 60° C. for 6 hours.

Following completion of polymerization, the system was cooled to 30° C. A particulate product N-methyl maleimide-isobutene copolymer (hereinafter, will be referred to as MMI) was recovered in a centrifugal separator and dried. The yield was 1.7 kgs.

Elemental analysis of the product copolymer showed C; 64.7% by weight, H; 7.8% by weight and N; 8.4% by weight. The copolymer showed a 50:50 molar ratio of the N-methyl maleimide unit to isobutene unit. The copolymer had an Mw of 95,000.

Preparation 2: Synthesis of N-ethyl maleimide-isobutene copolymer

A 3-liter autoclave provided with a stirrer, a nitrogen gas inlet, a thermometer and a degassing outlet was charged with 100 grams of N-ethyl maleimide, 1 gram of t-butyl peroxyneodecanoate and 1.5 liters of toluene. After replacement of the interior space with nitrogen gas, the autoclave was charged further with 0.8 liters of isobutene. Then the system was warmed to 60° C. Polymerization was allowed to proceed at 60° C. for 6 hours.

Following completion of polymerization, the reacted liquor was poured into methanol to deposit N-ethyl maleimide-isobutene copolymer (hereinafter, will be referred to as EMI) out the liquor. The resulting EMI was washed throughly with methanol, filtered out, and dried at 80° C. for 24 hours in a vacuum drier.

Elemental analysis of the product EMI indicated a 50:50 molar ratio of N-ethyl maleimide unit to isobutene unit in the product copolymer. The copolymer had an Mw of 92,000.

Example 1

The MMI product from Preparation 1 (10 grams), a commercially available vinyl chloride resin (manufactured and sold by Taiyo Embi Co., Ltd. under trade name "TH-1000"; polymerization degree=1000; 90 grams), butyl tin maleate stabilizer (4.2 grams), a commercially available acrylic processing aid (manufactured and distributed by Mistubishi Rayon under trade name "Metablen"; 1.3 grams) and a commercially available montan said wax ("Wax-op" manufactured by Hoechst-Japan) were mixed and kneaded at 200° C. for 5 minutes at 50 r.p.m. in a small mixer ("Laboplastomill" manufactured by Toyo Seiki K.K.) to give a resin composition.

The resulting composition was transparent and had a glass transition temperature of 85° C. at a single thermal peak. The presence of the glass transition temperature at the single peak was indicative of that the MMI copolymer and the vinyl chloride resin were compatible with each other.

The resin composition was press-molded at 200° C. to prepare test specimens, which were used for determining flexural strength.

The measurement results are set forth in Table 1.

Examples 2–4

The procedure of Example 1 was repeated with various relative proportions of MMI and vinyl chloride resin as listed in Table 1, to produce various resin compositions and to test them.

All of the resin compositions were transparent and showed respective single transition temperatures. The measurement results are set forth in Table 1.

Example 5

The procedure of Example 3 was repeated except that the EMI copolymer from Preparation 2 was used in place of the MMI from Preparation 1, to prepare a resin composition and test it.

The resulting resin composition was transparent and showed a single peak glass transition temperature. The results are set forth in Table 1.

Comparative Example 1

The procedure of Example 1 was repeated without addition of the MMI copolymer to the resin composition. The glass transition temperature and mechanical properties data are set forth in Table 1.

TABLE 1

| Examples | RMI (g) | PVC (g) | glass transition temp. (° C.) | flexural strength (kg/cm$^2$) | flexural modulus (kg/cm$^2$) |
| --- | --- | --- | --- | --- | --- |
| 1 | 10 | 90 | 85 | 1100 | 33000 |
| 2 | 20 | 80 | 93 | 1250 | 34500 |
| 3 | 30 | 70 | 101 | 1400 | 35500 |
| 4 | 40 | 60 | 109 | 1420 | 39000 |
| 5 | 30 | 70 | 92 | 1200 | 33500 |
| Comp. 1 | 0 | 100 | 78 | 950 | 29000 |

RMI: maleimide-olefin copolymer
PVC: vinyl chloride resin

As disclosed herein; the resin composition of the invention is highly transparent and has improved heat resistance and satisfactory mechanical properties. The resin composition may be advantageously used in the production of various articles such as hot water pipings, underground electrical cable pipings, industrial sheets, insulating sheets, etc.

What is claimed is:

1. A resin composition which comprises about 1–99% by weight of a maleimide-olefin copolymer and about 99–1% by weight of a vinyl chloride resin, said maleimide-olefin copolymer comprising about 30–70 mol % of at least one kind of structural unit (1) and about 70–30 mol % of at least one kind of structural unit (2):

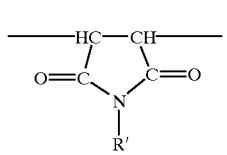
(1)

wherein $R^1$ represents an alkyl group having 1–4 carbon atoms or a cycloalkyl group having 3–10 carbon atoms;

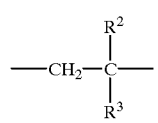
(2)

wherein $R^2$ and $R^3$ represent each and independently a hydrogen atom or an alkyl group having 1–8 carbon atoms.

2. The resin composition of claim 1 in which the maleimide-olefin copolymer has a weight-average molecular weight of from about $1 \times 10^3$ to about $5 \times 10^6$ calculated in terms of polystyrene as determined by gel permeation chromatography and the vinyl chloride resin is of a polymerization degree of about 100–5000.

3. The resin composition of claim 1 in which the maleimide-olefin copolymer comprises 45–55 mol % of structural unit (1) and 55–45 mol % of structural unit (2).

4. The resin composition of claim 1 in which structural unit (1) is derived from at least one N-substituted maleimide monomer selected from the group consisting of N-methyl maleimide, N-ethyl maleimide, N-propyl maleimide, N-isopropyl maleimide, N-butyl maleimide, N-isobutyl maleimide, N-t-butyl maleimide, N-cyclopropyl maleimide and N-cyclohexyl maleimide.

5. The resin composition of claim 1 in which structural unit (2) is derived from at least one olefin selected from the group consisting of ethylene, propylene and isobutene.

6. The resin composition of claim 1 in which the maleimide-olefin copolymer is selected from the group consisting of N-methyl maleimide-isobutene copolymer, N-ethyl maleimide-isobutene copolymer and N-cyclohexyl maleimide-isobutene copolymer.

7. The resin composition of claim 1 in which the vinyl chloride resin is selected from the group consisting of polyvinyl chloride, vinyl chloride-vinyl acetate copolymer, vinyl chloride-ethylene copolymer and vinyl chloride-vinyl propionate copolymer.

8. The resin composition of claim 1 in which the maleimide-olefin copolymer comprises further a third comonomeric component such as maleic anhydride.

9. The resin composition of claim 1 in which the maleimide-olefin copolymer is pre-blended with a compatible resin such as acrylonitrile-styrene copolymer.

10. An article formed from the resin composition according to any one of the preceding claims.

* * * * *